under 35 U.S.C. 154(b) by 525 days.

United States Patent
Sridhar et al.

(10) Patent No.: US 7,898,982 B2
(45) Date of Patent: Mar. 1, 2011

(54) LOGICAL GROUP ENDPOINT DISCOVERY FOR DATA COMMUNICATION NETWORK

(75) Inventors: Kamakshi Sridhar, Plano, TX (US); David Elie-Dit-Cosaque, Allen, TX (US); Gerard Damm, Plano, TX (US)

(73) Assignee: Alcatel Lucent, Paris (FR)

( * ) Notice: Subject to any disclaimer, the term of this patent is extended or adjusted under 35 U.S.C. 154(b) by 525 days.

(21) Appl. No.: 11/468,530

(22) Filed: Aug. 30, 2006

(65) Prior Publication Data
US 2007/0223493 A1 Sep. 27, 2007

Related U.S. Application Data

(60) Provisional application No. 60/784,724, filed on Mar. 22, 2006.

(51) Int. Cl.
*H04L 12/28* (2006.01)
(52) U.S. Cl. ..................................... 370/254
(58) Field of Classification Search ................. 370/254, 370/255
See application file for complete search history.

(56) References Cited

U.S. PATENT DOCUMENTS

| | | | |
|---|---|---|---|
| 7,515,542 B2* | 4/2009 | Hertoghs et al. | 370/236.2 |
| 2004/0042416 A1* | 3/2004 | Ngo et al. | 370/254 |
| 2005/0099955 A1* | 5/2005 | Mohan et al. | 370/242 |
| 2006/0002311 A1 | 1/2006 | Iwanaga et al. | |
| 2006/0031482 A1* | 2/2006 | Mohan et al. | 709/224 |
| 2006/0133284 A1* | 6/2006 | Elie-Dit-Cosaque et al. | 370/241.1 |
| 2008/0219172 A1* | 9/2008 | Mohan et al. | 370/241.1 |

FOREIGN PATENT DOCUMENTS

| WO | 0074338 A2 | 12/2000 |
|---|---|---|
| WO | 2005041456 A1 | 5/2005 |

OTHER PUBLICATIONS 802.1ag—Connectivity Fault management Tutorial—Part 1, Jul. 12, 2004☐☐(Nortel Networks).*
802.1ag—Connectivity Fault management Tutorial—Part 1, Jul. 12, 2004 (Nortel Networks).*
Sridhar, et al.; End-to-End Ethernet Connectivity Fault Management in Metro and Access Networks; Jun. 30, 2005; pp. 1-14; Retrieved from the internet: URL: http://www1.alcatel-lucent.com/publications/abstract.jhtml?repositoryItem=tcm%3A172-288441635 Retrieved on Aug. 18, 2008.
International Search Report and Written Opinion mailed Jan. 14, 2008.

* cited by examiner

*Primary Examiner*—Chirag G Shah
*Assistant Examiner*—Amarnauth Persaud
(74) *Attorney, Agent, or Firm*—Garlick, Harrison & Markison, LLP

(57) ABSTRACT

A method and system for logical group endpoint discovery in a data communication network is disclosed. A network endpoint receives from a source a request identifying a logical group and determines whether a port associated with the endpoint is a member of the logical group. If a port associated with the endpoint is a member of the logical group, the endpoint transmits to the source a reply identifying the port and the logical group. The request may be multicast while the reply may be unicast. The logical group may be a VLAN or a multicast group. The source and endpoint are preferably 802.1ag maintenance endpoints. The request may include an IEEE 802.1ag continuity check multicast address as a destination address.

9 Claims, 4 Drawing Sheets

LOGICAL GROUP ENDPOINT DISCOVERY FOR DATA COMMUNICATION NETWORK

CROSS-REFERENCE TO RELATED APPLICATION

This application claims the benefit of U.S. provisional application No. 60/784,724 entitled "vQuery (VLAN Query)," filed on Mar. 22, 2006.

BACKGROUND OF THE INVENTION

The present invention relates to management of data communication networks and, more particularly, virtual local area network (VLAN) and multicast group endpoint discovery in operator and service provider networks.

In an operator or service provider network, VLAN endpoint misconfigurations can cause serious problems. Since VLANs have precedence over Institute of Electrical and Electronics Engineers Std. 802.1ag (IEEE 802.1ag) maintenance levels, a misconfigured VLAN on an IEEE 802.1ag maintenance endpoint (MEP) can render the MEP unreachable and result in inadvertent connectivity loss alarms being reported by all other MEP at the same maintenance level. Moreover, a misconfigured VLAN can inadvertently allow unauthorized traffic to pass through a network endpoint or cause authorized traffic to be blocked by a network endpoint, resulting in potential security breaches or customer dissatisfaction. It is therefore desirable to discover and resolve VLAN endpoint misconfigurations at the earliest possible time, preferably before running IEEE 802.1ag connectivity fault management (CFM) or opening the network to external traffic.

In a service provider network, it is also desirable to learn multicast group endpoint configurations. For example, a service provider may want to monitor what multicast content its customers are viewing for security, billing, marketing or other purposes.

There are known protocols for transmitting VLAN configuration information. For example, in Cisco Systems, Inc.'s VLAN trunking protocol (VTP), when a new VLAN is configured on a switch, the new VLAN is advertised to other switches in the same domain. And in Cisco Systems, Inc.'s VLAN query protocol (VQP), a switch queries a VLAN membership policy server (VPMS) with a media access control (MAC) address of a LAN-attached node and, in response, is given a VLAN assignment for the switch port attached to the node. Neither VTP nor VQP provides for querying network endpoints to learn what VLANs are operative thereon and thereby learn of misconfigurations.

There are also known protocols for discovering node characteristics, such as eXchange IDentification (XID). In one implementation of XID, a resource may send an XID Command including a specified value to a node and the node may confirm support for the specified value by returning an XID Response including the specified value. XID is not, however, known to be VLAN or multicast group aware. Moreover, XID has no inherent mechanism to limit responses to a multicast XID Command strictly to endpoints. If an XID Command is multicast, then all XID-aware nodes on the path between the resource and the endpoints will respond, and the XID Command will even be propagated by the endpoints to the external network.

SUMMARY OF THE INVENTION

The present invention, in some embodiments, leverages the Ethernet CFM framework defined in IEEE 802.1ag to enable highly efficient learning of VLAN and multicast group endpoints in operator and service provider networks. IEEE 802.1ag defines continuity check (CC) frames. CC frames are typically multicast by a source MEP to all other MEP at a particular maintenance level to confirm connectivity between the source MEP and the other MEP. In some embodiments of the present invention, a source MEP applies a reserved IEEE 802.1ag CC multicast address to a novel VLAN or multicast group discovery request frame type, hereinafter called a vQuery_request frame, such that only other MEP of an operator or service provider network process the vQuery_request, and such that only members of a VLAN or multicast group identified in the vQuery_request respond with a VLAN or multicast group discovery reply frame type, hereinafter called a vQuery_reply frame. VLAN and multicast group endpoint configurations are thereby efficiently detected. vQuery message exchanges are generally applied to switched Ethernet networks. Such networks may include various types of multiplexing nodes, such as switches, Digital Subscriber Line Access Multiplexers (DSLAMs) and edge aggregation devices, for example, that have Ethernet protocol support.

In one embodiment of the invention, therefore, a method for discovering network endpoint VLAN associations comprises: receiving by an endpoint from a source a request identifying a VLAN; determining by the endpoint whether a port associated with the endpoint is a member of the VLAN; and, if a port associated with the endpoint is a member of the VLAN, transmitting by the endpoint to the source a reply identifying the port and the VLAN.

In another embodiment of the invention, a method for discovering network endpoint multicast group associations comprises: receiving by an endpoint from a source a request identifying a multicast group; determining by the endpoint whether a port associated with the endpoint is a member of the multicast group; and, if a port associated with the endpoint is a member of the multicast group, transmitting by the endpoint to the source a reply identifying the port and the multicast group.

In another embodiment of the invention, a method for discovering network endpoint logical group associations comprises: receiving by an endpoint from a source a multicast request identifying a logical group; determining by the endpoint whether a port associated with the endpoint is a member of the logical group; and, if a port associated with the endpoint is a member of the logical group, transmitting by the endpoint to the source a unicast reply identifying the port and the logical group. The logical group may be a VLAN or a multicast group.

In some embodiments, the request identifies a response time and the transmitting step is performed at a random time before the response time has elapsed.

In some embodiments, the request includes an IEEE 802.1ag CC multicast address as a destination address.

In some embodiments, the source is an IEEE 802.1ag maintenance endpoint.

In some embodiments, the endpoint is an IEEE 802.1ag maintenance endpoint.

In some embodiments, the method is performed at least twice, wherein in a first instance the identified VLAN is a management VLAN and in a second instance the identified VLAN is a data VLAN.

These and other features of the present invention will be better understood by reference to the detailed description of the preferred embodiment read in conjunction with the drawings briefly described below. Of course, the scope of the invention is defined by the appended claims.

DETAILED DESCRIPTION OF A PREFERRED EMBODIMENT

Figure 1:
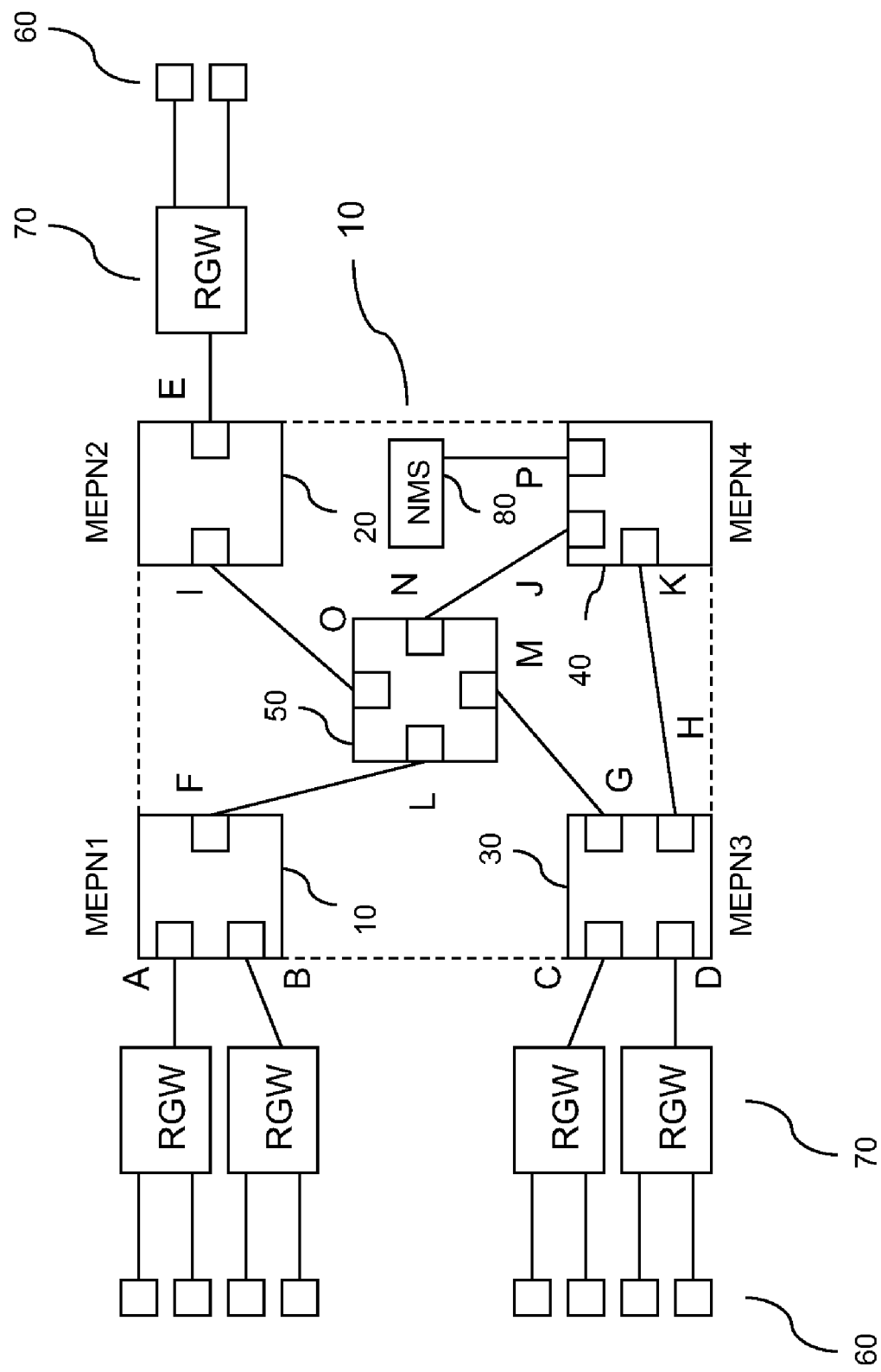
FIG. 1 shows a service provider network in one embodiment of the invention.

FIG. 1 shows a service provider network 10 in one embodiment of the present invention. Network 10 includes multiple MEP nodes 10, 20, 30, 40 communicatively coupled via a maintenance intermediate point (MIP) node 50. MEP nodes 10, 20, 30 have residential gateway (RGW)-facing ports A-E communicatively coupling MEP nodes 10, 20, 30 with customer RGWs 70 via modem equipment (not shown). RGWs 70 are in turn communicatively coupled with customer end systems 60. In some embodiments, RGWs 70 are bridges having Ethernet ports for coupling with customer end systems 60 and Digital Subscriber Line (DSL) uplink ports for coupling with MEP nodes 10, 20, 30 via DSL modems (not shown). In some embodiments, end systems 60 include personal computers, storage devices and game consoles, by way of example. MEP nodes 10, 20, 30, 40 have network-facing ports F-K communicatively coupling MEP nodes 10, 20, 30, 40 with other MEP nodes 10, 20, 30, 40 and MIP node 50. MEP node 40 has network-facing ports J and K, but has no RGW-facing port. Naturally, the number and connectivity of MEP nodes and MIP nodes may differ in other embodiments of the invention. Additionally, in other embodiments of the invention a service provider network may be connected to enterprise networks in addition to or instead of residential networks.

MEP nodes 10, 20, 30, 40 are data communication nodes that transmit and receive messages via ports A-K and have hardware and software thereon to support Ethernet bridging, IEEE 802.1ag Ethernet CFM and logical group endpoint discovery capabilities within network 10. Logical group endpoint discovery capabilities preferably include VLAN endpoint discovery capabilities and multicast group endpoint discovery capabilities hereinafter described. Ethernet CFM and logical group endpoint discovery capabilities are supported by one or more IEEE 802.1ag MEP hardware or software entities resident on MEP nodes 10, 20, 30, 40. MEP hardware and software entities may operate on a per-node, per-module or per-port basis. In some embodiments, MEP nodes 10, 20, 30 are Ethernet-based DSLAMs while MEP node 40 is an Ethernet edge switch.

MEP node 40 has a Network Management System (NMS)-facing port P communicatively coupling MEP node 40 with a NMS node 80 for communicating network management information. In some embodiments, MEP node 40 has a Simple Network Management Protocol (SNMP) agent thereon and network management information logged on MEP node 40 is transmitted to NMS node 80 via SNMP polling and SNMP trap messages.

MIP node 50 is a data communication node that transmits and receives messages via ports L-O and has hardware and software thereon to support Ethernet bridging and IEEE 802.1ag Ethernet CFM within network 10. Ethernet CFM is supported by one or more hardware or software IEEE 802.1ag MIP entities resident on MIP node 50. MIP hardware and software entitles may operate on a per-node, per-module or per-port basis. In some embodiments, MIP node 50 is an Ethernet backbone switch.

Network-facing ports F-I may be associated with different service provider VLANs depending on customer requirements. For example, if the ones of end systems 60 that communicate with network 10 via ports A and E are associated with the same customer of network 10, or are associated with different customers to which common policies are to be applied, ports F and I may be members of the same service provider VLAN, whereas ports G and H may be associated with other service provider VLANs. Similarly, RGW-facing ports may be members of different multicast groups depending on customer requirements. For example, if the ones of end systems 60 associated with RGW-facing ports A and E are subscribers to the same multicast data stream, ports A and E may belong to the same multicast group, whereas RGW-facing ports B-D may be associated with other multicast groups. Naturally, a network-facing port may be associated with more than one service provider VLAN and an RGW-facing port may be associated with more than one multicast group. In some embodiments, service provider VLAN membership is statically configured, whereas port multicast groups memberships are learned dynamically through Internet Group Management Protocol (IGMP) snooping.

An important advantage of the present invention, in some embodiments, resides in extending the Ethernet CFM framework defined in IEEE 802.1ag to permit highly efficient learning of network endpoint VLAN and multicast group associations. Such learning is facilitated through transmission and processing of logical group discovery request and reply frames, sometimes referred to herein as vQuery_request and vQuery_reply frames, respectively. A vQuery_request frame is preferably an Ethernet management frame type that has the same general format as an IEEE 802.1ag Ethernet CFM continuity check (CC) frame except for newly-defined OPCODE and TLV values. More specifically, the vQuery_request frame type preferably includes, without limitation, the following fields:

Destination Media Access Control address (DMAC) is a 6-byte field that contains a multicast media access control (MAC) address that is reserved for IEEE 802.1ag CC frames.

Source MAC address (SMAC) is a 6-byte field that contains a unicast MAC address of the source MEP, that is, the MEP that originated the frame. The source MEP can be any IEEE 802.1ag MEP extended with logical group endpoint discovery capabilities. Source MEP may reside on, for example, a DSLAM, an Ethernet switch or a server node.

MAL is a 3-bit field that identifies the maintenance association (MA) level of the frame. For vQuery_request frames, the MAL value is generally one of two values reserved for service provider MA or one of two values reserved for operator MA.

OPCODE is an 8-bit field having a QTYPE (query type) that defines the type of vQuery_request. In some embodiments there are two QTYPE values, one for VLAN discovery requests and one for multicast group discovery requests.

TLV 1 is a first type-length-value formatted field that includes a value GROUP ID that uniquely identifies the logical group that is the subject of the vQuery_request. If QTYPE is VLAN discovery request then GROUP ID may be a 12-bit VLAN ID. If QTYPE is a multicast group discovery request then GROUP ID may be a 6-byte multicast MAC address that includes prefix bits defined by the IEEE followed by bits that identify a multicast group. In other embodiments, GROUP ID may include only bits that identify a multicast group. Generally speaking, GROUP ID has a one-to-one correspondence with a multicast channel in a multicast tree.

TLV 2 is a second type-length-value formatted field that includes a value RTIME which identifies a maximum time, in seconds, for responding to the vQuery_request. By providing a response window and programming each MEP to respond at a random time within the response window, transmission of vQuery_replies is staggered and a sudden storm of vQuery_reply frames at the source MEP is avoided. In some embodiments, vQuery_reply frames that are not received within RTIME are not processed by the source MEP. In other embodiments, vQuery_reply frames that are not received within RTIME plus a defined interval are not processed by the source MEP.

Figure 2:
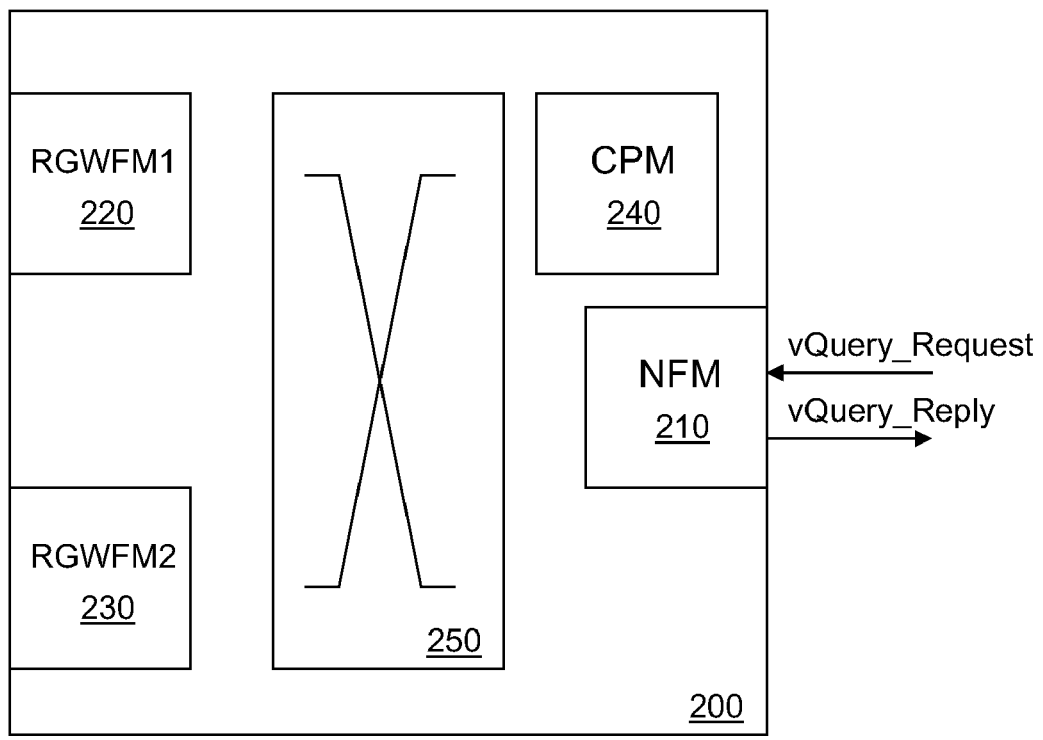
FIG. 2 shows a service provider MEP node in one embodiment of the invention.

Turning now to FIG. 2, a service provider MEP node 200 is shown in one embodiment of the invention. Node 200 includes a first RGW-facing module (RGWFM1) 220, a second RGW-facing module (RGWFM2) 230, a central processing module (CPM) 240 and a network-facing module (NFM) 210, all of which are communicatively coupled via a switch fabric 250. Each RGW-facing module is associated with one or more hardware- or software-based packet processors for processing inbound and outbound packets (for example, Ethernet data frames) and one or more RGW-facing physical ports for receiving and transmitting packets. The network-facing module is associated with one or more hardware- or software-based packet processors for processing inbound and outbound packets (for example, Ethernet data frames) and one or more network-facing physical ports for receiving and transmitting packets.

Each physical port is associated with a port identifier (port ID), one or more VLANs each associated with a VLAN ID and zero or more multicast groups each associated with a multicast MAC address. Each port ID, VLAN ID and multicast MAC address is unique within the service provider network. The port ID may be a MAC address or may have a switch/slot/port format, for example. The VLAN and multicast group associations define which data frames pass through the physical ports. For example, in some embodiments, Ethernet frames assigned to a VLAN are not allowed to pass through a physical port that is not a member of that VLAN.

CPM 240 includes a software-based management processor for switch management and processing of exceptional packets. In some embodiments, CPM 240 also includes an IEEE 802.1ag MEP extended with support for logical group endpoint discovery. In these embodiments, CPM 240 includes lookup tables for tracking logical group memberships, for example, VLAN and multicast group memberships, of the physical ports on node 200. In other embodiments, NFM 210 has software-based processing including an IEEE 802.1ag MEP extended with support for logical group endpoint discovery, as well as lookup table for tracking logical group memberships of the physical ports on node 200. In either case, logical group endpoint discovery includes, without limitation, receiving and processing vQuery_ request frames and originating and transmitting vQuery_reply frames on behalf of node 200.

Figure 3:
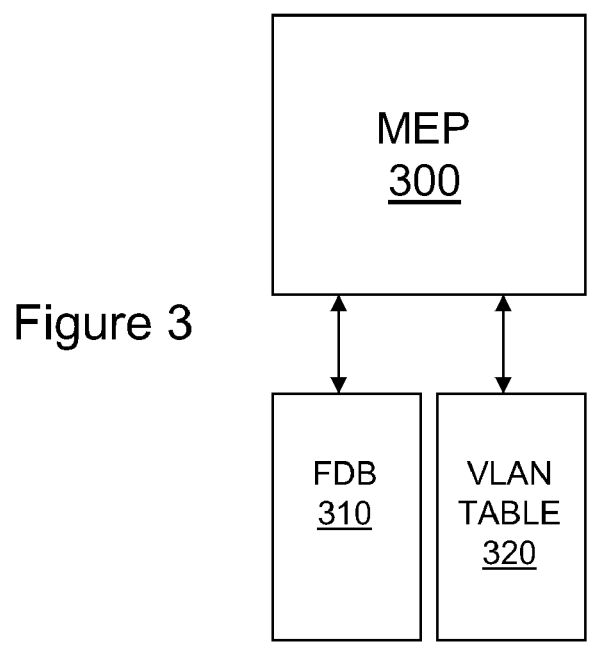
FIG. 3 shows a MEP and associated forwarding database and VLAN table in one embodiment of the invention.

Turning now to FIG. 3, elements invoked in logical group endpoint discovery are shown. MEP 300 has access to forwarding database (FDB) 310 and VLAN table 320. FDB 310 is a lookup table that stores forwarding addresses and associated port IDs. Among the forwarding addresses stored in FDB 310 are multicast MAC addresses associated with active multicast groups. In some embodiments, active multicast groups are learned by snooping IGMP packets passing through node 200. VLAN table 320 is a lookup table that stores VLAN IDs and associated port IDs. In some embodiments, VLAN/port ID associations are statically configured.

Figure 4:
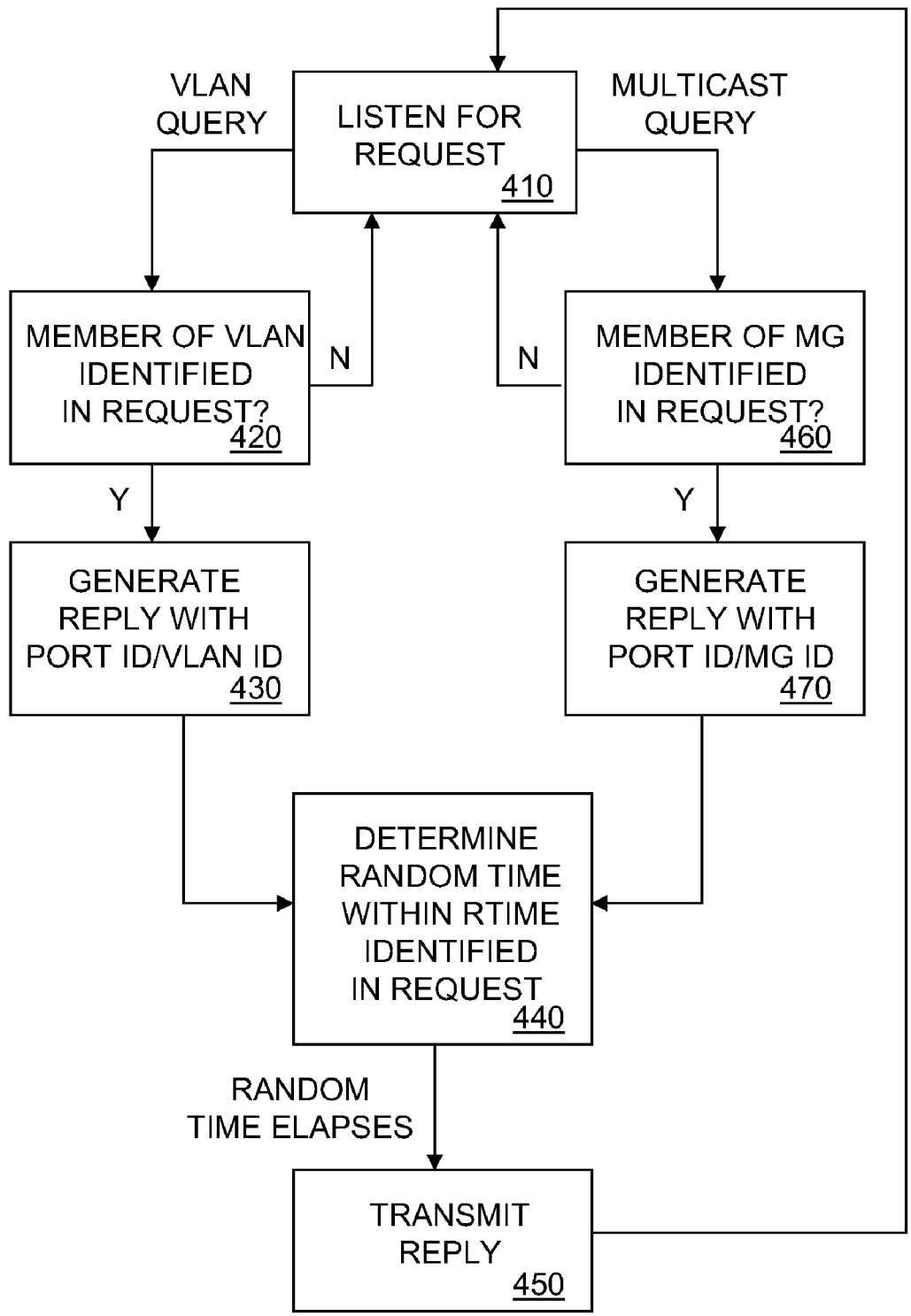
FIG. 4 is a flow diagram describing steps performed by a MEP that receives a vQuery_request in one embodiment of the invention.

Turning now to FIG. 4, a vQuery_request processing state machine operative on MEP 300 is shown in one embodiment. MEP 300 begins in a listening state, wherein MEP 300 awaits receipt of a vQuery_request (410). A vQuery_request may be initiated by any MEP in a network that is part of the same maintenance association level as MEP 300, that has been extended with support for logical group endpoint discovery and that desires to learn network VLAN or multicast group endpoints. For example, in FIG. 1, MEP node 40 may be charged with initiating vQuery_requests within service provider network 10 and logging information received in vQuery_replies for eventual reporting to NMS node 80 via SNMP.

When a vQuery_request frame arrives at NFM 210, if NFM 210 has MEP 300 resident thereon then vQuery_request is passed directly to MEP 300. Alternatively, if CPM 240 has MEP 300 resident thereon then the vQuery_request frame is transmitted on switch fabric 250 to CPM 240. In either event, the vQuery_request frame is captured for processing by reference to the CC Multicast MAC address in the DMAC field of the vquery_request frame. Importantly, the vquery_request frame is terminated by MLP 300, with the consequence that the vquery_request frame does not leave the network in which it was originated.

MLP 300 consults the OPCODE field of the vquery_request and identifies the request as either a VLAN discovery request or a multicast group discovery request based on the QTYPE. If the vquery_request is a VLAN discovery request, MLP 300 consults the TLV1 field and identifies the VLAN ID that is the subject of the request. MLP 300 then consults VLAN table 320 and determines the network-facing ports that MLP 300 represents on node 200 that are members of the identified VLAN (420). If MLP 300 represents one or more network-facing ports that are members of the identified VLAN, MLP 300 generates one or more vquery_replies, placing member port IDs and the VLAN ID in specified fields (430). In some embodiments, a separate vquery_reply frame is generated for each member port. In other embodiments, multiple member port IDs are bundled in a single vquery_reply frame. In either event, the DMAC field in the vquery_reply frame or frames carries the SMAC address retrieved from the corresponding vquery_request frame. MLP 300 also consults the TLV2 field and determines a random time within RTIME for responding to the vquery_request (440). At that random time, MLP 300 transmits the vquery_reply (or replies) via NFM 210 (450) and returns to the listening state (410). If none of the network-facing ports that MLP 300 represents is a member of the identified VLAN, MLP 300 returns to the listening state without generating any reply.

If the vQuery_request is a multicast group discovery request, MEP 300 consults the TLV1 field and identifies the multicast group that is the subject of the request. MEP 300 consults FDB 310 and determines the RGW-facing ports on node 200 that MEP 300 represents that are members of the identified multicast group (460). If MEP 300 represents one or more RGW-facing ports that are members of the identified multicast group, MEP 300 generates one or more vQuery_replies, placing member port IDs and the GROUP ID in specified fields (470). In some embodiments, a separate vQuery_reply frame is generated for each member port. In other embodiments, multiple member port IDs are bundled in a single vQuery_reply frame. The DMAC field in the vQuery_reply frame carries the SMAC address from the vQuery_request frame. MEP 300 consults the TLV2 field and determines a random time within RTIME for responding to the vQuery_request (440). At that time, MEP 300 transmits such vQuery_reply (or replies) to the network via NFM 210 (450) and returns to the listening state (410). If none of the RGW-facing ports that MEP 300 represents is a member of the identified multicast group, MEP 300 returns to the listening state without generating any reply.

Note that while vQuery_request processing has been described in relation to a single node 200, vQuery_requests are in reality multicast. Accordingly, other nodes that receive the vQuery_request and have MEP at the MA level specified in the request will issue unicast vQuery_replies on behalf of their respective ports that support the identified VLAN or multicast group. Moreover, while vQuery_request processing has been described in relation to a node 200 and MEP 300 within a service provider network, in other embodiments vQuery_request receive processing may be performed by a node and MEP within an operator network, for example.

It bears noting that in some embodiments, an MEP node may have multiple MEP entities resident thereon, each of which represents a subset of physical ports on the MEP node, wherein each MEP entity is responsible for responding to vQuery_requests on behalf of physical ports on the MEP node that the MEP entity represents. In other embodiments, an MEP node may have a single MEP entity resident thereon, which represents all physical ports on the MEP node, wherein the single MEP entity is responsible for responding to vQuery_requests on behalf of all physical ports on the MEP node.

Figure 5:
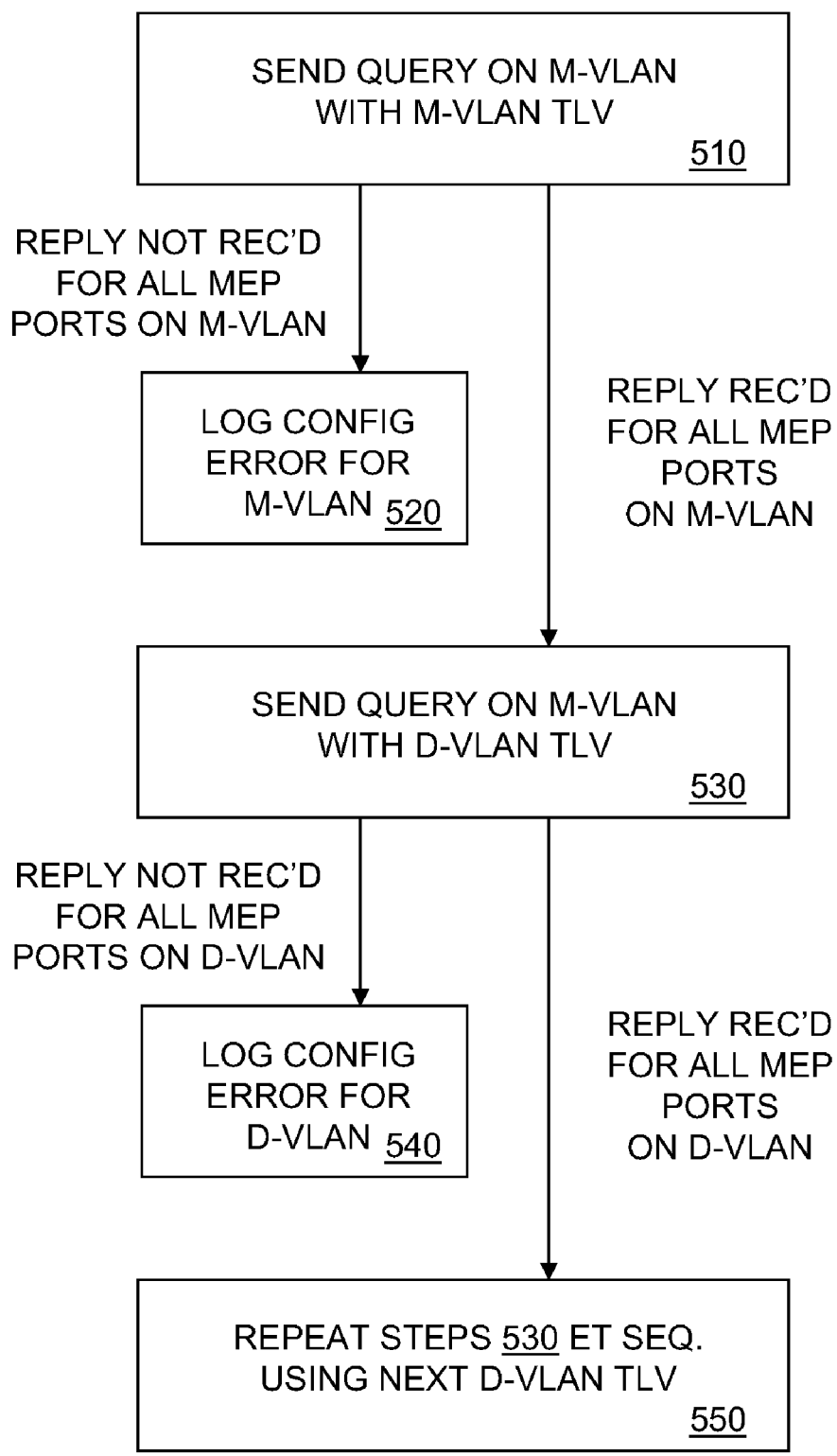
FIG. 5 is a flow diagram describing a method for discovering VLAN misconfigurations in one embodiment of the invention.

FIG. 5 illustrates, a flow diagram describes a method for discovering VLAN misconfigurations in one embodiment of the present invention. Such a method may be performed, for example, by an operator or service provider prior to network activation to avoid a large number of connectivity loss alarms from being reported, inadvertent transmission of allow unauthorized traffic and/or inadvertent blocking of authorized traffic.

According to the method of FIG. 5, configuration of a management VLAN (M-VLAN) is first tested. M-VLAN is a VLAN to which member ports of all data VLANs belong and that is used to test configuration of the data VLANs. In the M-VLAN test, a source MEP multicasts a first vQuery_request frame on M-VLAN (510). That is to say, the first vQuery_request frame has a VLAN ID of M-VLAN within an IEEE 802.1Q tag. The first vQuery_request frame also has a QTYPE of VLAN discovery request and a TLV1 VLAN ID of M-VLAN. If vQuery_replies are not received by the source MEP regarding all expected member ports of M-VLAN within RTIME specified in the first vQuery_request (or within a specified time after RTIME), it is known that M-VLAN is misconfigured. A configuration error is logged for M-VLAN (520) and the flow terminates. If, however, vQuery_replies are received regarding all member ports of M-VLAN within the specified response time, it is known that M-VLAN is correctly configured and a second vQuery_request frame is multicast on M-VLAN (530). The second vQuery_request frame has a QTYPE of VLAN discovery request and a TLV1 VLAN ID of a first data VLAN (D-VLAN). If vQuery_replies are not received from all member ports of the first D-VLAN within the specified response time, it is known that the first D-VLAN is misconfigured. A configuration error is logged for D-VLAN (540) and the flow terminates. If, however, vQuery_replies are received from all member ports of the first D-VLAN within the specified response time, it is known that the first D-VLAN is correctly configured and a third vQuery_request is multicast on M-VLAN respecting a second D-VLAN (550), and so on, until either an error is logged respecting a D-VLAN or correct configuration of all D-VLANs is verified. Once correct configuration of all D-VLANs is verified, the operator or service provider commences IEEE 802.1ag Ethernet CFM and opens the network to external traffic.

Yet another useful application of the present invention is VLAN discovery in a service provider network that spans multiple operators wherein VLAN IDs are translated as a frame traverses the network boundaries between operators. In such a scenario, a source MEP may multicast a vQuery_request with a QTYPE of VLAN discovery request and a TLV1 VLAN ID of the VLAN sought to be discovered. MEPs operative across a network boundary at the same MA level will respond with a vQuery_reply provided the VLAN ID in the vQuery_request matches the VLAN ID operative across the boundary. VLANs otherwise not discoverable due to translation are thereby rendered discoverable.

Although this invention has been described in certain specific embodiments, those skilled in the art will have no difficulty devising variations which in no way depart from the scope and spirit of the present invention. It is therefore to be understood that this invention may be practiced otherwise than is specifically described. For example, although the above embodiments have been described with respect to extending the IEEE 802.1ag protocol, it may be applicable to other Operation, Administration and Maintenance (OAM) protocols. Moreover, while the above embodiments have been described with respect to VLAN and multicast group endpoint discovery, the teachings of the invention may be applied to discovery of other endpoint parameters. Thus, the present embodiments of the invention should be considered in all respects as illustrative and not restrictive, the scope of the invention to be indicated by the appended claims and their equivalents rather than the foregoing description.

What is claimed is:

1. A method for discovering network endpoint virtual local area network (VLAN) associations, comprising:
receiving by an IEEE 802.1ag maintenance endpoint (MEP) at a particular IEEE 802.1ag type maintenance association (MA) level from a source MEP, a request for identifying one or more VLAN endpoints at the particular MA level, wherein the request includes an IEEE 802.1ag type maintenance association level (MAL) field that identifies a service provider MA level or an operator MA level and a query type field identifying a VLAN discovery request;
when the MAL field in the request identifies the particular maintenance level of the MEP, determining by the MEP whether a port associated with the MEP is a member of the VLAN identified in the request; and
when a port associated with the MEP is a member of the VLAN, transmitting by the MEP to the source MEP a reply identifying the port and the VLAN.

2. The method of claim 1, wherein the request identifies a response time and the transmitting step is performed before the response time has elapsed.

3. The method of claim 2, wherein the transmitting step is performed at a random time before the response time has elapsed.

4. The method of claim 1, wherein the request is multicast to a plurality of IEEE 802.1ag maintenance endpoints at the particular maintenance level and the reply is unicast to the source.

5. The method of claim 1, wherein the request includes an IEEE 802.1ag continuity check multicast address as a destination address.

6. The method of claim 1, wherein the method is performed at least twice, wherein in a first instance the identified VLAN is a management VLAN and in a second instance the identified VLAN is a data VLAN.

7. A method for discovering network endpoint logical group associations, comprising:

receiving by an IEEE 802.1ag maintenance endpoint (MEP) at a particular IEEE 802.1ag type maintenance association (MA) level from a source MEP, a multicast request for identifying one or more logical group endpoints at the particular MA level, wherein the logical group includes a VLAN and wherein the request includes an IEEE 802.1ag type a maintenance association level (MAL) field that identifies a service provider MA level or an operator MA level and a query type field identifying a logical group discovery request;

when the MAL field in the request identifies the particular maintenance level of the MEP, determining by the MEP whether a port associated with the MEP is a member of the logical group identified in the request; and if a port associated with the MEP is a member of the logical group, transmitting by the MEP to the source MEP a unicast reply identifying the port and the logical group.

8. The method of claim 7, wherein the request identifies a response time and the transmitting step is performed before the response time has elapsed.

9. The method of claim 7, wherein the wherein the request includes an IEEE 802.1ag continuity check multicast address as a destination address.

* * * * *